United States Patent [19]

Troy

[11] Patent Number: 4,738,799

[45] Date of Patent: Apr. 19, 1988

[54] PERMANENT DISPOSAL OF RADIOACTIVE PARTICULATE WASTE

[75] Inventor: Michael Troy, Allagheny, Pa.

[73] Assignee: Westinghouse Electric Corp., Pittsburgh, Pa.

[21] Appl. No.: 864,369

[22] Filed: May 19, 1986

Related U.S. Application Data

[62] Division of Ser. No. 547,293, Oct. 28, 1983, Pat. No. 4,623,510.

[51] Int. Cl.⁴ ........................ G21F 9/16; B01D 35/06; G21C 19/00

[52] U.S. Cl. .................................... 252/633; 210/222; 250/506.1; 252/628; 376/272; 376/313; 376/315

[58] Field of Search ............... 376/272, 315, 313, 309; 250/506.1, 507.1; 252/633, 628, 626; 55/100; 210/222, 223

[56] References Cited

U.S. PATENT DOCUMENTS

| | | | |
|---|---|---|---|
| 3,982,134 | 9/1976 | Housholder et al. | 250/506.1 |
| 3,984,345 | 10/1976 | Heylen et al. | 376/310 |
| 4,197,467 | 4/1980 | Williams | 250/507.1 |
| 4,217,213 | 8/1980 | Schuster | 376/315 |
| 4,257,912 | 3/1981 | Fleischer et al. | 376/272 |
| 4,436,655 | 3/1984 | Masotto | 252/633 |
| 4,476,394 | 10/1984 | Muller et al. | 250/507.1 |
| 4,491,540 | 1/1985 | Larker et al. | 252/633 |

FOREIGN PATENT DOCUMENTS

| | | | |
|---|---|---|---|
| 54-134300 | 10/1979 | Japan | 252/633 |

*Primary Examiner*—John F. Terapane
*Assistant Examiner*—Howard J. Locker
*Attorney, Agent, or Firm*—D. C. Abeles

[57] ABSTRACT

A cartridge for the permanent storage and disposal of radioactive particulate waste composed of a liquid impervious casing enclosing a waste storage region provided with a ferromagnetic matrix made of steel wool, together with inlet and outlet conduits suitably associated with the waste storage region to enable a liquid containing such waste material to be conducted through the matrix while the particulate waste is adhered thereto under the influence of a magnetic field and the remaining liquid filtrate is expelled from the cartridge, and to then permit an encapsulating material, such as a resin-catalyst mixture, to be introduced into the waste storage region to completely fill that region. The cartridge is temporarily connected into a system including remotely controllable valves and conduits for permitting the liquid containing waste material to be introduced into the cartridge while the liquid component thereof is removed to a storage container, and the encapsulating material to be then introduced into the waste storage region, followed by direct insertion of the cartridge into a drum which can be subsequently sealed and permanently stored, all of this occurring in a fully mechanized and remote manner which does not require the exposure of any operating personnel to significant radiation dose.

14 Claims, 4 Drawing Sheets

FIG. 2
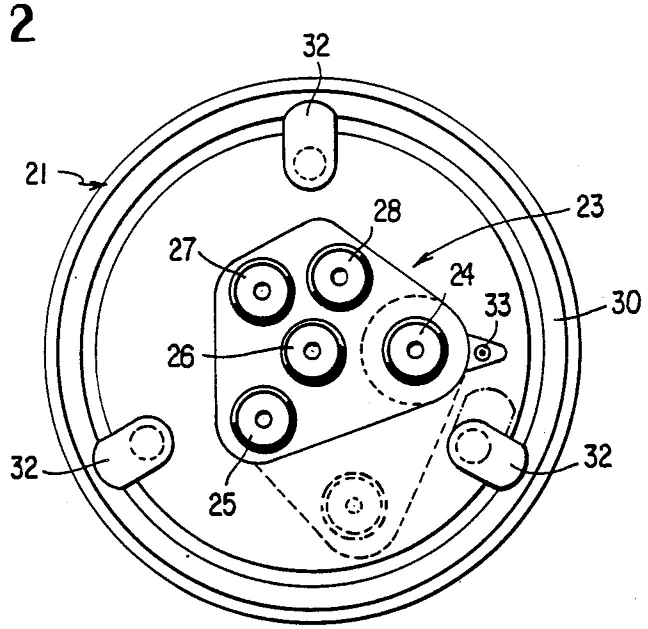
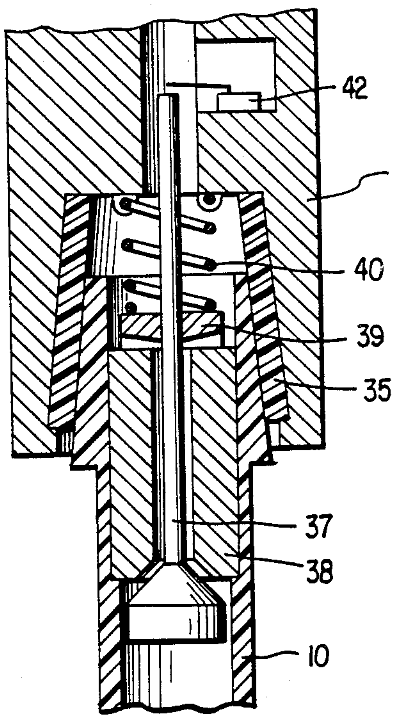
FIG. 3

PERMANENT DISPOSAL OF RADIOACTIVE PARTICULATE WASTE

This is a division of application Ser. No. 06/547,293, filed Oct. 28, 1983, now U.S. Pat. No. 4,623,510.

BACKGROUND OF THE INVENTION

The present invention relates to permanent disposal of radioactive waste from nuclear reactors, particularly radioactive wastes from primary coolant fluid systems and steam generator blowdown sludge.

In the operation of nuclear power plants, radioactive particular waste develops in the primary coolant fluid and in the sludge produced during steam generator blowdown. In the latter case, primary-to-secondary leakage in the steam generator requires that the blowdown sludge be treated as radioactive waste.

All radioactive waste from a nuclear reactor must be processed for disposal in a manner which minimizes the exposure of operating personnel to radiation. The conventional filter cartridges utilized in the auxiliary systems of a nuclear power plant have been found to be difficult to handle and to create a significant radiation exposure hazard for the maintenance personnel. To help alleviate this hazard, replacement of conventional removable cartridge filters with backflushable filters has been proposed. Backflushable filters, however, while convenient, serve only as temporary collection and holding devices. Final removal of the radioactive particulate waste, or "crud", requires backflushing of these filters to convey the waste to a suitable disposal plant for packaging and burial.

SUMMARY OF THE INVENTION

It is an object of the present invention to prepare such waste for permanent disposal in a manner which minimizes the radiation exposure hazard to operating personnel.

Another object of the invention is to transfer such radioactive waste to permanent storage containers by a fully remotely controllable system which enables the operating personnel to be safely isolated from regions where radiation is present.

Another object of the invention is to permanently store radioactive particulate waste in relatively inexpensive and structurally simple containers.

A further object of the invention is to permanently store such radioactive waste in pre-packaged. ferromagnetic filter matrices disposed within such containers.

A further object of the invention is to permanently store such radioactive waste in the form of a uniform, dewatered dispersion of solid radioactive waste, encapsulated in an organic resin solidification system in a liquid-impervious disposal package.

Another object of the invention is to permanently store such radioactive waste in a disposable electromagnetic filter cartridge in conjunction with a backflushable filtration system forming part of a nuclear plant fluid system.

The above and other objects are achieved, according to the invention, by the provision of a noval cartridge for permanent disposal of radioactive particulate waste, comprising: a liquid impervious casing having an upper end cover, a lower end cover and a side wall extending between the covers, the casing enclosing a waste storage region; ferromagnetic fibrous material defining a waste retaining matrix and filling a major portion of the waste storage region; means defining an inlet conduit extending through the upper end cover and axially of the casing through the waste storage region, and opening into the waste storage region in the vicinity of the lower end cover; and means defining first and second outlet conduits extending through the upper end cover and opening into the waste storage region in the vicinity of the upper end cover.

Preferably, the casing and the conduits are all made of a suitable plastic, such as fiberglass, with all components being securely bonded together, for example by means of a suitable adhesive, to form a rigid unit.

In accordance with a particular novel feature of the invention, the ferromagnetic fibrous material is constituted by ordinary steel wool, preferably of a fine grade. The grade employed will be determined, at least to a substantial extent, by the size of the particles to be stored, as will be explained in detail below.

Preferably, the cartridge further includes two annular, perforated retainer-distribution plates spaced apart in the axial direction of the casing and delimiting the portion of the waste storage region containing the matrix. Between each retainer-distribution plate and an associated cover for the casing, there is thus defined a space for the circulation of fluids between the portion of the waste storage region containing the matrix and the various conduits.

Preferably, the upper end cover of the cartridge casing is formed to present a reservoir for holding any liquid which may spill during the introduction of liquid containing the radioactive waste of flushing water to the cartridge. Any spillage can be removed by means of a siphon tube introduced into that reservoir during the filling operations. In addition, the upper end cover is formed, at its top, to present a lateral flange, preferably an inwardly extending annular flange, which partly covers the reservoir and which is used to lock the cartridge to an associated filling system.

In the use of this cartridge, a slurry containing the radioactive waste to be stored will be delivered via the inlet conduit, while the liquid filtrate contained in that slurry as well as subsequently delivered flushing water, are expelled via the first output conduit. After the flushing water has been circulated through the waste storage region, dewatering air is introduced via the inlet conduit and is expelled via the first outlet conduit. During this operation, the second outlet conduit will be blocked and the cartridge will be disposed within a magnetic field which acts to trap the particulate waste in the matrix.

During the subsequent encapsulation operation, which also takes place while the cartridge is in the magnetic field, encapsulating material is injected via the inlet conduit, while the air previously trapped in the cartridge is expelled via the second outlet conduit, the first outlet conduit then being blocked. Introduction of the encapsulating material continues until the interior of the cartridge is completely filled.

In order to monitor the filling of the cartridge with encapsulating material, the second outlet conduit is provided with a check valve which is oriented to be closed by the pressure exerted by the encapsulation material when it enters the second outlet conduit. Closing of the valve actuates a microswitch that is also disposed in the second outlet conduit in order to produce a signal indicating completion of filling with the encapsulating material.

The encapsulating material can be of any suitable composition already known in the art, such as known resin-catalyst systems, or even cement.

The ends of the conduits which project from the cartridge all project from the upper end thereof and preferably have conically tapered surfaces to define coupling components. While the conically tapered surfaces are preferably exterior surfaces which define male coupling elements, they may also be constituted by interior conduit surfaces to define female coupling components.

Preferably, the bottom cover is provided, at its lower surface, with an alignment groove which will cooperate with a lug provided on an associated conveyor to assure that the cartridge is correctly alinged with conduits of a cartridge filling system, the latter conduits being formed, at their lower ends, to present coupling elements constructed to mate with those of the cartridge conduits.

The objects of the invention are further achieved by the provision of a novel system for storage and encapsulation of radioactive particulate waste, comprising: a cartridge having a liquid impervious casing enclosing a waste storage region, a ferromagnetic waste storage matrix housed in the cartridge and occupying at least a major portion of the waste storage region, and an inlet conduit and at least one outlet conduit projecting from the cartridge and communicating with the waste storage region; means for establishing a magnetic field in the matrix; fluid handling means including a source of liquid containing the radioactive waste to be stored in the cartridge, a source of flushing water, a source of air, a source of encapsulating material, and a receptacle of receiving flushing water; cartridge filling means including a plurality of conduits releasably couplable to the conduits associated with the cartridge; and fluid flow control means including a plurality of remotely controllable valves connected between the fluid handling means and the cartridge filling means, the fluid flow control means having a first operating state for selectively supplying liquid containing the radioactive waste, flushing water, or air from their respective sources to the inlet conduit for loading the matrix with radioactive waste, while placing one outlet conduit in communication with the receptacle, and the fluid flow control means having a second operating state, for supplying encapsulating material from its source to the inlet conduit for filling the cartridge with encapsulating material, while permitting air in the cartridge to be expelled via one outlet conduit.

Preferably, of course, the cartridge of the above system is of the type described earlier herein. The means for establishing a magnetic field is preferably constituted by an annular solenoid presenting an axial passage dimensioned to permit introduction of the cartridge. Systems employing a solenoid to apply an electromagnetic field to a ferromagnetic storage medium are already known in the art.

According to one preferred embodiment of the system according to the invention, the cartridge has first and second outlet conduits, the cartridge filling means is movable between a first operating position associated with the first operating state of the fluid flow control means and second operating position associated with the second operating state of the fluid flow control means, the conduits of the cartridge filling means are grouped into a first set of conduits releasably couplable to the conduits associated with the cartridge when the cartridge filling means are in the first operating position, and a second set of conduits releasably couplable to the conduits associated with the cartridge when the cartridge filling means are in the second operating position, the one outlet conduit which is placed in communication with the receptacle is the first outlet conduit, and the one outlet conduit via which air is permitted to be expelled when the fluid flow control means is in the second operating state is the second outlet conduit.

The cartridge filling means includes one conduit which is common to both sets, and the movement of the cartridge filling means between its first and second operating positions is effected by pivoting the filling means about the axis of the common conduit. Preferably, this common conduit is coupled to the second outlet conduit of the cartridge and constitutes the conduit via which air is vented from the waste storage region of the cartridge during filling with encapsulating material.

The cartridge filling means is preferably constituted by a turret carrying the various conduits. The turret is supported by a column which is, in turn, supported in a loading head constituted by a cylindrical housing having a closed upper end and an open lower end. The housing is constructed to permit its lower end to form a sealed connection with the top of the cartridge. In addition, the column is movable vertically relative to the loading head to displace the turret between a raised, or retracted, position when the conduits associated with the cartridge filling means are separated from those of the cartridge, and a lowered, or coupled, position in which one set of conduits of the cartridge filling means will be coupled in a sealed manner to the cartridge conduits.

The turret further carries a siphon tube which is positioned to be introduced into a reservoir formed at the top of the cartridge, around the projecting ends of the associated conduits, to permit aspiration of any liquid which may spill onto the top of the cartridge during the course of the filling operation.

The loading head further carries a group of locking cams arranged to cooperate with a flange formed at the upper end of the cartridge in order to lock the cartridge against the lower end of the loading head during the various filling operations.

The valves of the fluid flow control means can all be of a conventional type. These valves are preferably electrically controllable to permit remote-controlled operation of the system.

The objects of the invention are further achieved by operating the system defined above as follows: placing the cartridge filling means in the first operating position and coupling the first set of conduits in a sealed manner to the conduits associated with the cartridge; operating the establishing means for establishing a magnetic field in the matrix; while the first set of conduits is coupled to the conduits associated with the cartridge, effecting loading of waste material by operating the fluid flow control means for blocking the second outlet conduit and sequentially supplying liquid containing the radioactive waste via the inlet conduit to the waste storage region until the matrix is loaded with waste while conducting liquid from the waste storage region via the first outlet conduit to the receptacle, supplying flushing water via the inlet conduit to the waste storage region and from the waste storage region via the first outlet conduit to the receptacle, and supplying air via the inlet conduit to the waste storage region and from the waste storage region via the first outlet conduit until substantially all liquid has been removed from the waste storage region; after the step of effecting loading of waste material, decoupling the first set of conduits from the conduits associated with the cartridge, placing the cartridge filling means in the second operating position, and coupling the second set of conduits in a sealed manner to the conduits associated with the cartridge; and while the second set of conduits is coupled to the conduits associated with the cartridge, effecting encapsulation of the waste material by operating the fluid flow control means for blocking the first outlet conduit, and supplying encapsulating material via the inlet conduit until the waste storage region is filled with encapsulating material, while removing air from the waste storage region via the second outlet conduit.

The method and apparatus according to the present invention serves to produce a dewatered dispersion of reactor coolant system corrosion products or steam generator blowdown sludge in a water-impervious organic resin-steel wool matrix, encapsulated in a plastic cylinder which can be automatically loaded, immediately after the encapsulation operation, into a standard shipping container whose top is subsequently sealed in a subsequent conventional operation. Operation of this system according to the present invention provides a convenient, economical and efficient technique for preparing backflush slurry or sludge for disposal at minimal risk of significant radiation exposure to personnel.

The invention is particularly applicable to the storage of particulate matter which has been transported through a reactor coolant system and its auxiliaries. Such particulate matter consists largely of corrosion products having small particle sizes ranging from a few microns to colloidal size, as well as a certain amount of ion exchanger resin fines and, occasionally, bits of debris from various sources. All of the material is radioactive since it has been subjected to the neutron flux in the reactor.

The coolant system auxiliaries include cartridge filters installed to remove particulate matter having sizes in the range of several microns. Some of the smaller particles either agglomerate or adhere to larger particles and are removed therewith. The auxiliaries may also include a CVCS letdown demineralizer which filters larger particles and absorbs some colloidal material which then is removed when the resins are replaced. The internal surface of the reactor coolant system, and especially the core, are the overwhelming competitors of the waste particles since the rate of filtration through the auxiliaries is a small fraction of the reactor coolant flow (less than 0.05%). The waste particles depositing on these surfaces account for 85% of the occupational radiation exposure experienced by plant personnel.

When the steam generators of such reactor systems exhibit primary-to-secondary leakage, the blowdown sludge from these generators must be handled as radioactive waste. This sludge can also be removed by collecting it in backflushable filters forming part of the reactor system, and then transporting it to cartridges for permanent storage in accordance with the present invention.

The system according to the invention for premanently storing such particulate waste material in cartridges takes advantage of the magnetic properties of the reactor coolant particulates and the steam generator sludge to effect a quantitative dewatering of the waste material, together with efficient packaging for burial. In order to utilize the magnetic properties of the waste particles, introduction of the waste material into the cartridge, as well as subsequent introduction of encapsulating material, are carried out while the cartridge is within a magnetic field. According to techniques known in the art, this can be achieved by introducing the cartridge into an axial passage enclosed by an annular solenoid generating the requisite magnetic field level.

To avoid damaging the cartridge or in case of failure to achieve proper engagement between the cartridge and the cartridge filling means, appropriate interlocks can be provided to prevent attempted engagement of the cartridge filling means with the cartridge when the two are not correctly positioned relative to one another.

The system according to the present invention would be well suited for handling waste products derived from high temperature large flow rate filtration of reactor coolant.

The system according to the invention could also be used for disposal of radioactive material produced during decontamination of steam generators. For example, it is known to decontaminate the primary side channel heads of such steam generators by means of a slurry of boron oxide in water which is applied in a manner to "grit blast" the channel head surfaces. Other grits which have been considered are magnetite and aluminum oxide. The purpose of such decontamination is to remove the highly radioactive primary corrosion deposit, i.e. nickel ferrite, so that the radiation source strength will be lower and result in a lower radiation does to operating personnel. A process of this type employing boron oxide could produce of the order of 20,000 gallons of 4–5% boric acid solution with a high concentration of nickel ferrite particles. The system according to the present invention could be employed to dispose of the waste (or crud), enabling the boric acid solution itself to be reused as a carrier for boron oxide for other steam generators, or to be disposed of. If magnetite were used as the abrasive, it, along with the nickel ferrite "crud", could be collected and permanently stored according to the invention leaving essentially clean water for reuse or disposal.

The system according to the present invention could, if desired, be mounted on a trailer and carried to the place where it would be used, such use being carried out either in connection with existing tankage, or temporarily constructed tankage.

The system according to the invention could also be constructed with a plurality of operating stations disposed along a conveyor line, so that a plurality of cartridges could be simultaneously loaded with waste material.

BRIEF DESCRIPTION OF THE DRAWING

FIG. 2 is a bottom plan view of a loading head and turret assembly according to the invention.

FIG. 3 is an elevational, cross-sectional detail view of a component of the cartridge of FIG. 1 coupled to a conduit of the assembly of FIG. 2.

DESCRIPTION OF THE PREFERRED EMBODIMENTS

Figure 1:
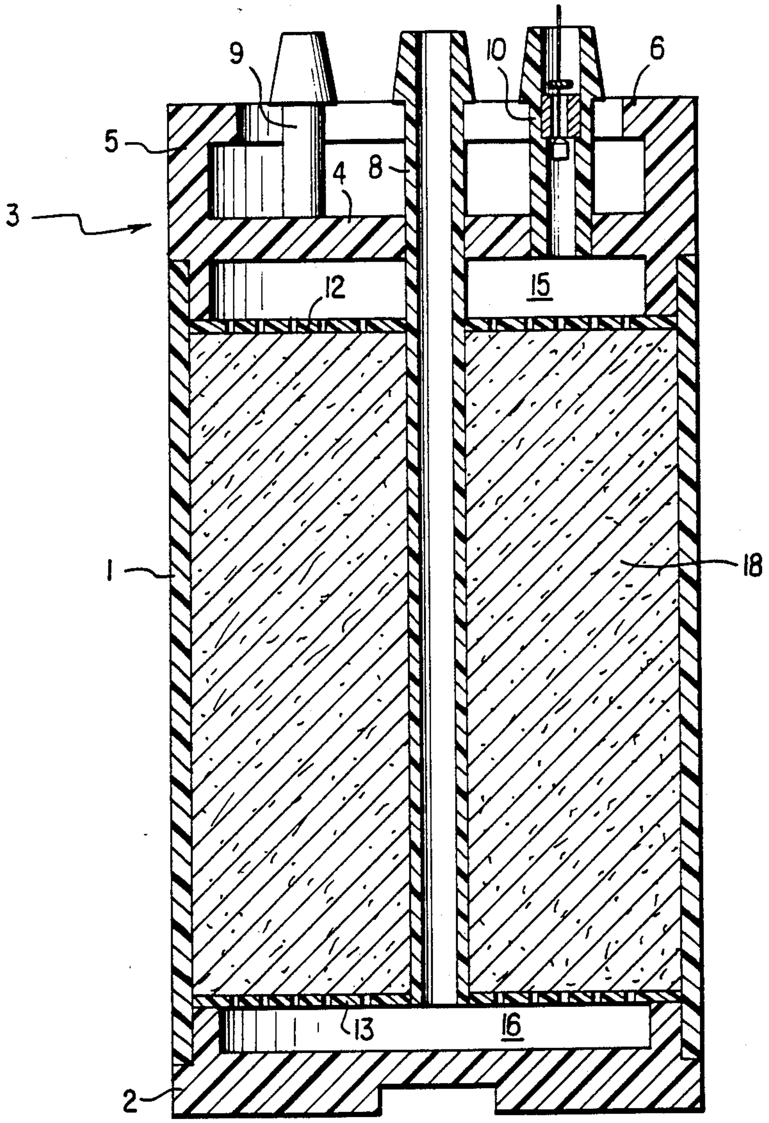
FIG. 1 is an elevational cross-sectional view of a preferred embodiment of a cartridge according to the present invention.

One preferred embodiment of a disposable cartridge according to the invention is illustrated in Figure 1 where the cartridge has the form of a cylindrical container defined by a cylindrical side wall 1, a bottom cover 2 and a top cover 3, the bottom cover 2 and the top cover 3 being permanently secured to respective axial ends of cylindrical side wall 1 to delimit a closed space.

The top cover 3 includes a plate portion 4 and an upstanding portion 5 presenting, at its upper end, an inwardly directed annular flange 6.

Secured to, and passing through, plate portion 4 are three tubular conduits 8, 9 and 10 which project upwardly beyond annular flange 6 and whose upper ends are formed to define male nozzles or couplers. Conduit 8 is centered on the axis of the cartridge and extends downwardly to the region of the bottom of the space enclosed by the container, which space constitutes a waste storage region. Conduits 9 and 10, on the other hand, terminate at the lower surface of plate portion 4 and thus open into the upper region of the enclosed space.

Within the enclosed space defined by the container, there are disposed two annular, perforated retainer-distribution plates 12 and 13, each surrounding, and secured to, tubular conduit 8. The upper perforated plate 12 is secured to top cover 3 and defines therewith an annular space 15. Similarly, lower perforated plate 13 is secured to bottom cover 2 and defines therewith a circular space 16.

All of the components identified thus far are preferably made of fiberglass, or other suitable plastic, and are firmly bonded together, as by cementing, to form a single, rigid unit.

Plates 12 and 13 delimit an annular space which is filled with a fibrous mass 18 constituting a ferromagnetic filter matrix and preferably constituted by ordinary steel wool.

The use of steel wool as a matrix for electromagnetic filters is well known in the art and has been found to be highly efficient in producing the steep magnetic field gradients needed to filter such weakly paramagnetic particles as cupric oxide from coolant streams. Magnetically saturated nickel ferrite (also known colloquially as "crud") is attracted by a given magnetic gradient and field strength to an extent which is three orders of magnitude greater than cupric oxide of the same particle size. Steam generator sludge is mostly magnetite, which is magnetically similar to nickel ferrite, together with other magnetic oxides of iron and copper.

Particle size is the main consideration in selecting a proper matrix for the system according to the present invention. As is disclosed in the article by J. A. Oberteuffer, *Magnetic Separation: A Review of Principles, Devices, and Applications,* IEEE Trans. on Mag., Volume Mag-10, June, 1974, the optimum matrix element diameter is about three times that of the particles to be trapped. Therefore, a fine steel wool will give better results than coarser screen matrices for very small particles.

In the usual electromagnetic filter, a graded screen matrix is employed since the filter must both be an efficient filter when the magnetic flux is applied and a poor filter, so as to be easily backflushed, when the flux is removed. Since, in the present case, there is no backflush requirement for the filter itself, a graded screen matrix is not required.

The bottom cover 2 of the embodiment shown in FIG. 1 is provided with a groove which is formed to mate with a lug on the conveyor which will transport the cartridge to its associated filling station. This groove assures correct orientation of the cartridge and therefore of its conduits 8, 9 and 10, at the filling station.

Reverting to top cover 3, the upstanding portion 5 and annular flange 6 cooperate to form a reservoir in which any spilled liquid will collect, and from which that liquid can be removed before the cartridge is installed and sealed into a permanent storage drum. Flange 6 also serves as a lifting lug and gripping ring via which the cartridge is raised into its filling position at the filling station, as will be described below.

Two outlet conduits are provided because the waste loading operation and the resin filling operation present different requirements; the valve in conduit 10 for monitoring the resin filling operation would interfere with fluid flow during waste loading.

The disposal system for loading the cartridge with particulate waste includes a loading head and turret assembly having conduits constructed to mate with the conduits 8, 9 and 10 to provide the requisite fluid flow connections.

FIG. 2 is a bottom plan view of one preferred embodiment of the loading head and turret assembly, which is essentially composed of a cylindrical housing 21 closed at the top and open at the bottom, and a turret 23 carrying five conduits 24, 25, 26, 27 and 28. Turret 23 is mounted in housing 21 to be pivotal about the axis of conduit 24, as will be described in detail below. The lower end of each of conduits 24–28 is given the form of a female coupler constructed to form a releasable, sealed connection with the coupler at the upper end of a respective one of the conduits 8, 9 and 10, of FIG. 1.

At the lower edge of cylindrical housing 21 there is provided an annular gasket 30 for forming a sealed connection between the lower housing edge and the upper surface of top cover 3 of the cartridge.

Housing 21 carries three equispaced locking and lifting cams 32 which are pivotal between a locking position, shown in solid lines, in which they will bear against the lower surface of flange 6 to press that flange against gasket 30, and a release position, shown for one of cams 32 in broken lines, which permits the loading head and turret assembly to be lifted away from the cartridge.

The turret 23 is pivotal, about the axis of conduit 24, between two operating positions. In both operating positions, conduit 24 is located to be coupled to conduit 10 of the cartridge. In the first operating position, associated with the introduction of particulate waste material into the cartridge, the position of turret assembly is such that conduit 26 will mate with conduit 8 and conduit 25 will mate with conduit 9. In the second operating position, employed for backfilling the cartridge with resin, conduit 28 will mate with conduit 8 and conduit 27 will mate with conduit 9.

Turret 23 additionally carries a siphon tube 33 for siphoning off any liquid which may accumulate in the reservoir formed by upstanding portion 5 and annular flange 6 of top cover 3.

FIG. 3 is a detail view illustrating the conduits 10 and 24 in their coupled position, which exists when the disposal cartridge is secured to the loading head and turret assembly and turret 23 is in its lowered position.

At its lower end, the interior of conduit 24 has a conical wall which opens downwardly and in which is seated a gasket 35 made of neoprene, or other suitable material. Gasket 35 is dimensioned to effect a sealed coupling between the upper end of conduit 10 and the lower end of conduit 24.

As indicated above in the description of Figure 1, conduit 10 is provided with a check valve which is composed of a valve stem and body 37 and a valve guide and seat 38 secured to the interior wall of conduit 10. A retainer disc 39 is secured to the valve stem and normally rests upon the upper edge of valve guide and seat 38. Retainer disc 39 is configured to rest against the upper edge of valve guide and seat 38, while permitting the flow of air therepast, when the valve is in its open position.

The valve is biased in its open condition by a light spring 40 whose upper end is secured within conduit 24 and whose lower end bears against the upper surface of disc 39. Associated with the upper end of valve stem and body 37 is a microswitch 42 which will be actuated when the valve is closed by upward pressure exerted by plotting resin in conduit 10. Otherwise, the valve assembly remains in its open condition.

Figure 4:
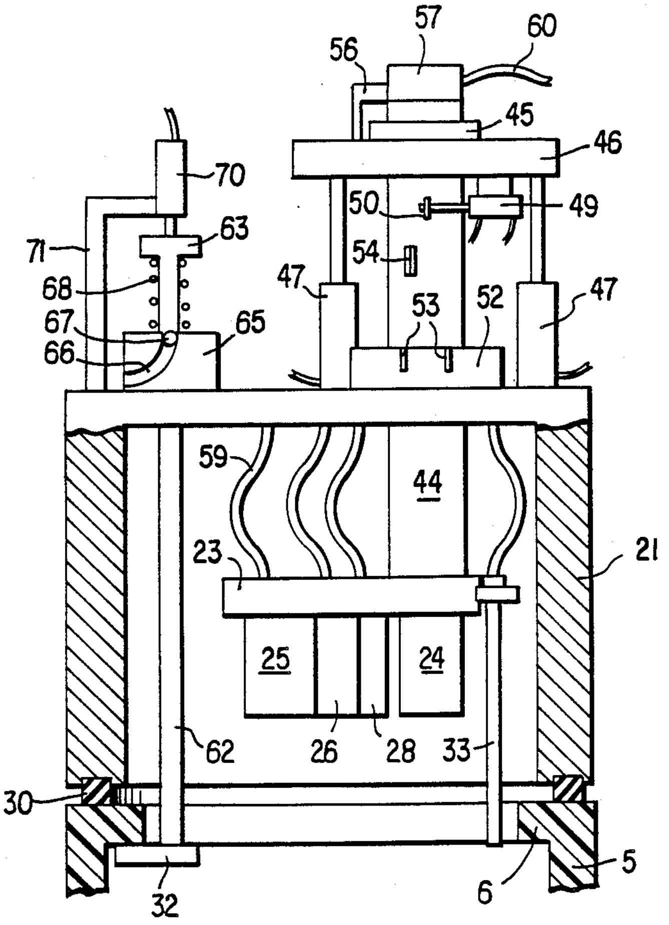
FIG. 4 is a partly cross-sectional, partly elevational view of the assembly of FIG. 2 coupled to the cartridge of FIG. 1.

FIG. 4 is an elevational view, partly in cross-section, illustrating one preferred embodiment of the loading head and turret assembly of FIG. 2 secured to the top of the cartridge shown in FIG. 1. For the sake of clarity, only the annular flange 6 and part of the upstanding portion 5 of the cartridge are shown in FIG. 4, i.e. the conduits forming part of that cartridge are not illustrated. In addition, only the cylindrical side wall of housing 21 is shown in cross-section.

Turret 23 is shown in its raised, or retracted, position, in which position the lower ends of conduits 24–28 are separated from the upper ends of conduits 8–10.

Turret 23 is supported for pivotal movement about the axis of conduit 24 by means of a column 44 which extends upwardly through the top of housing 21 via a suitable opening which is provided in the top of the housing and which may be furnished with a suitable seal. Column 44 is provided, near its top, with a bearing collar 45 which is secured to column 44 and rests upon a support plate 46. Thus, plate 46 supports column 44 and turret 23 through the intermediary of bearing collar 45. Column 44 and collar 45 are rotatable, about the axis of conduit 24, relative to plate 46. For this purpose, collar 45 can include a suitable roller bearing or slide bearing via which it rests upon plate 46.

Plate 46 is supported by a plurality of piston-cylinder assemblies 47. Typically, three such assemblies can be provided, two of which are visible in FIG. 4. The cylinder portions of assemblies 47 are supported on the top of housing 21, while the piston rods thereof support plate 46. Assemblies 47 may be of the pneumatic type.

Supported from the underside of plate 46 is a further piston-cylinder assembly 49 whose piston is articulated to a lug 50 carried by column 44. Assembly 49, which may also be of the pneumatic type, is operated to act on lug 50 in order to rotate column 44 between the two operating positions of turret 23. Also mounted on the top of housing 21 is a guide collar 52 which is fixed to the top of housing 21 and serves to assist in guiding the movements of column 44. Collar 52 is provided with two keyways 53, either one of which may cooperate with a key 54 secured to column 44 in order to maintain turret 23 in the desired operating position when column 44 and turret 23 have been lowered to couple appropriate ones of conduits 24–28 with conduits 8–10.

Plate 46 additionally supports, via a support arm 56, a rotary coupling 57. The coupling 57 is thus prevented from rotating when column 44 is rotated by the action of piston-cylinder assembly 49. Coupling 57 contains a conventional mechanically operated valve which can be shifted between an open position and a closed position by rotation of column 44 relative to rotary coupling 57. The fluid passage associated with conduit 24 extends upwardly through the entire length of column 44 to communicate with the flow path defined by the above-described valve.

The flow passages in conduits 25, 26 and 28 are connected, at the top of turret 23, to flexible hoses 59 which pass out of housing 21 and are coupled to suitable valves of the disposal system, to be described below. The valve in rotary coupling 57 is similarly connected to the remainder of the disposal system via a flexible hose 60.

Housing 21 further carries three locking and lifting cams, only one of which is shown in FIG. 4 to facilitate clarity of the illustration of the other components shown in that figure. Each cam 32 is supported by a support rod 62 extending upwardly through the top of housing 21 and terminating at its upper end in a circular shoulder 63. The opening through which rod 62 passes may be provided with a suitable seal if required. Rod 62 also passes through a guide block 65 provided with a camming groove 66. Rod 62 carries a cam follower 67, which may be in the form of a roller, constructed to cooperate with groove 66. Locking and lifting cam 32 is biased into the locking position, shown in FIG. 4, by a suitable compression spring 68 held between shoulder 63 and guide block 65.

The system can also be provided with suitable interlocks associated, inter alia, with assemblies 70 and 47 to prevent the conduits on turret 23 from engaging conduits 8, 9 and 10 if cartridge 75 is not properly locked to head 21 or the conduits are not properly aligned.

For moving each cam 32 into its release position, there is provided a further pneumatic piston-cylinder assembly 70 carried by a support arm 71 secured to the top of housing 21. The piston rod of assembly 70 bears against the top of shoulder 63. When air under pressure is supplied to assembly 70, the piston thereof is forced downwardly, causing follower 67 to follow camming groove 66. Because of the configuration of groove 66, this produces an initial downward movement of cam 32, followed by a rotation thereof into the release position shown in broken lines in FIG. 2. Thus, the mechanism for controlling the movement of each cam 32 is of the "fail-safe" type in that a failure in the high pressure air supply will assure that spring 68 brings or maintains cam 32 in its locking position. When the three cams 32 are in their locking position, gasket 30 is pressed between the upper surface of flange 6 and the lower edge of housing 21 in order to seal the region enclosed thereby.

When the turret assembly is lowered to bring selected ones of conduits 24–28 into communication with conduits 8–10, the lower end of siphon tube 33 will come within a fraction of an inch of the upper surface of plate portion 4 of the cartridge, so that siphon tube 33 can be employed to withdraw any liquid which may have spilled into the reservoir above plate portion 4 and enclosed by upstanding portion 5 and flange 6. As also shown in FIG. 4, the upper end of siphon tube 4 is connected to a flexible tube via which any liquid extracted by the siphon is conducted to a suitable storage tank.

Figure 5:
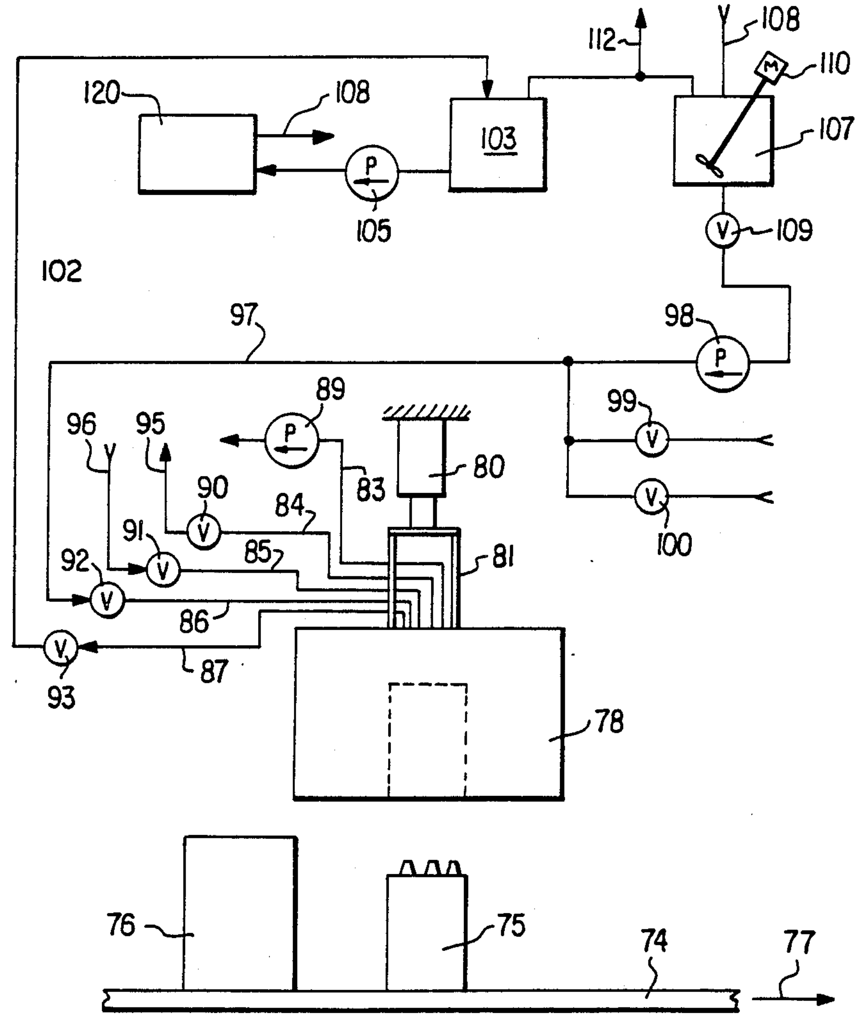
FIG. 5 is a partly pictorial, partly schematic view of a loading system according to the invention.

FIG. 5 illustrates, in schematic form, one suitable embodiment of a backflush disposal system according to the invention for loading a cartridge with particulate waste.

The system includes a conveyor 74, which can be of any suitable conventional type, on which a cartridge 75, having the form shown in FIG. 1, and a disposal drum 76 are conveyed in succession in the direction of arrow 77. Conveyor 74 includes a suitable lug which mates with the groove in bottom cover 2 in order to assure correct orientation of cartridge 75. When cartridge 75 arrives at a drumming station, it comes to a position below an annular solenoid 78 presenting a circular, vertical passage into which drum 75 and the loading head and turret assembly can be introduced.

The loading head and turret assembly, and more specifically housing 21, is suspended from a hydraulic ram 80 via loader arms 81 secured to the top of housing 21, at diametrically opposed points adjacent its periphery. Fluid conduits 83, 84, 85, 86 and 87 extend from respective ones of the flexible hoses associated with the conduits 24, 25, 26 and 28 and siphon tube 33 carried by turret 23 (FIG. 4). In the embodiment shown in FIG. 5, conduit 83 is connected to siphon tube 33, conduit 84 is connected to, or constitutes an extension of, flexible hose 60, and conduits 85, 86 and 87 are connected to, or constitute extensions of, the flexible hoses 59 connected to conduits 28, 26 and 25, respectively. Conduit 27 of turret assembly 23 is utilized during the resin filling process, and is permanently blocked to seal conduit 9 during this process, as will be discussed in greater detail below.

Each of conduits 83–87 is in the form of a flexible hose having a length selected to allow for the required vertical movements of the loading head and turret assembly. As with the other components of the system, these hoses are made of a material, or are provided with a lining, suitable for the fluids to be conveyed.

Conduit 83 is connected to a pump 89 which is operated during the waste material filling process to remove any water or slurry that may collect in the reservoir provided at the top of the disposal cartridge. Conduits 84, 85, 86 and 87 are connected to respective ones of valves 90, 91, 92 and 93, which may be of any suitable, conventional type and which may be electrically operated at the appropriate times in the disposal process. These valves, like other valves provided in the system, are constructed, or lined, to be compatible with the materials being handled. Valve 90 could be eliminated since its function duplicates somewhat that of the valve in coupling 57.

Valve 90 is connected to a conduit leading to a controlled vent, which may be of any suitable, conventional type. Valve 91 is connected via a conduit 96 to a source of a suitable resin-catalyst mixture which is to be pumped into the cartridge after it has been filled with waste material and dewatered.

Valve 92 is connected to a conduit 97 which leads to a pump 98 for supplying the waste mixture which is to be delivered to the cartridge, as well as to a valve 99 via which clean flush water can be supplied and a valve 100 via which air under pressure can be supplied. Valve 93 is connected to a conduit 102 which communicates with the inlet of a flush water storage tank 103. Tank 103 has an outlet conduit connected to a pump 105 via which flush water is delivered to a device 120, such as one or more backflush filters, from which the waste material is to be removed.

The system further includes a receiving tank 107 having an inlet conduit 108 connected to device 120 to receive the waste material to be stored and an outlet conduit connected to the inlet of pump 98 via a valve 109. Receiving tank 107 may be equipped with a stirrer driven by a motor 110. A conduit 112 leading to a controlled vent communicates with the upper region of the interior of each of tanks 103 and 107.

The system shown in FIG. 5 can be operated as follows.

A disposal cartridge 75 and a storage drum 76 are placed one behind the other on conveyor 74 and conveyor 74 is advanced in direction 77 to bring cartridge 75 into the position shown in solid lines. Cartridge 75 is correctly oriented by means of the cooperation between the groove in bottom cover 2 and the associated lug on conveyor 74, as described above. Ram 80 is then operated to lower arms 81, together with the loading head and turret assembly until cylinder 21 comes to rest against the upper surface of cartridge flange 6. At this time, turret 23 is in its raised position, shown in FIG. 4, and piston-cylinder assemblies 70 have been actuated so that cams 32 are in their release position. Turret 23 is, or has been, rotated into the operating position in which conduits 25 and 26 are in vertical alignment with conduits 9 and 8, respectively.

Then, piston-cylinder assemblies 70 are deactuated to cause cams 32 to first rotate and then move upwardly into their locking position, this position being shown for one cam 32 in FIG. 4, whereupon cartridge 75 is connected in a sealed manner to housing 21.

Piston-cylinder assemblies 47 are then controlled to permit support plate 46 to move downwardly, together with collar 45, column 44 and turret 23, so that conduits 25, 26 and 24 are coupled in a sealed manner to conduits 9, 8 and 10, respectively.

At the same time as the above operations, or prior thereto, a slurry containing the particulate waste material to be disposed of is delivered into receiving tank 107 via conduit 108. If, for example, the slurry is to be received from backflush filters, this is achieved by pumping water from storage tank 103 to the filters via pump 105, thereby causing slurry to be conveyed via conduit 108 to tank 107.

Then, solenoid 78 is energized to produce a magnetic field which traverses cartridge matrix 18. Typically, solenoid 78 is designed to produce, in its center passage in which cartridge 75 is disposed, a substantially uniform magnetic induction, or flux density, of the order of 5 kilogauss, when cartridge 75 is not present in the solenoid passage. When cartridge 75 is in the position shown in broken lines in FIG. 5, steel wool matrix 18 will create gradients in the magnetic field.

Then, valves 92, 93 and 109 are opened, all of the other valves being closed, and pump 98 is placed into operation to pump slurry from tank 107 and via conduits 86, 26 and 8 into circular space 16 at the cartridge bottom. The slurry then flows upwardly through the perforations in plate 13 and into matrix 18, where the particulate waste products are held in matrix 18 under the influence of the existing magnetic field. The remaining filtrate which passes through the perforations in plate 12 and into annular space 15 can flow through conduits 9, 25, 87 and 102 and via valve 93 into flush water storage tank 103. A sufficient quantity of slurry is pumped into cartridge 75 to produce a full load of particulate waste material in matrix 18.

Then valve 109 is closed, pump 98 is turned off, and valve 99 opened to convey clean flush water into the cartridge via conduit 8, the flush water also being conducted via conduits 9, 25, 87 and 102 to tank 103. Normally, two system volumes of flush water will be employed during each cartridge loading process. Periodically, some of the flush water held in tank 103 will be discharged to the plant waste processing system to compensate for the clean flush water which is added.

Then valve 99 will be closed and valve 100 opened to blow air under pressure through cartridge 75 in order to effect dewatering. During this operation, solenoid 78 remains energized to retain the particulate waste material in matrix 18. The dewatering air will also be conducted to tank 103, from which it can be expelled via conduit 112.

During the above operating steps, pump 89 can be in operation to remove, via siphon tube 33 and conduit 83, any liquid which may collect in the reservoir provided above cartridge plate portion 4. Pump 89 can be connected to deliver this liquid to tank 103.

Thereafter, all valves may be closed and piston-cylinder assemblies 47 are actuated to lift plate 46, together with turret 23. Then, piston-cylinder assembly 49 is actuated to pivot turret 23 about the axis of conduit 24 into its second operating position, in which conduits 27 and 28 will be vertically aligned with conduits 9 and 8, respectively, conduit 24 remaining vertically aligned with conduit 10. Then piston-cylinder assemblies 47 are again operated to lower plate 46, together with turret 23, so that a sealed coupling is formed between conduits 27, 28 and 24, on the one hand, and conduits 9, 8 and 10, respectively, on the other hand. Thereafter, valves 90 and 91 are opened, all other valves remaining closed. As noted above, conduit 27 is constructed to form a seal for conduit 9.

With solenoid 78 remaining energized, the selected encapsulating material, e.g. a resin-catalyst mixture, is pumped in via conduit 96, valve 91 and conduits 85, 28 and 8, while the air in cartridge 75 which is being displaced by the resin-catalyst mixture is permitted to escape via conduits 10, 24, 84 and 95 and valve 90, conduit 95 being connected to a controlled plant vent system. When the encapsulating material level in cartridge 75 reaches the level of valve 37, 38 in conduit 10, it forces valve stem and body 37 upwardly against the action of spring 40 until microswitch 42 is actuated, producing the control signal to halt the injection of the encapsulating material. At this time, the interior of the cartridge is completely filled with the encapsulating material.

Then, valves 90 and 91 are closed, solenoid 78 is deenergized, and conveyor 74 is actuated to bring drum 76 directly below cartridge 75. Drum 76 can be brought below cartridge 75 at any time after the cartridge has been raised into the broken line position shown in FIG. 5.

Thereafter, ram 80 is operated to lower cartridge 75 into drum 76.

Thereafter, piston-cylinder assemblies 70 are actuated to move cams 32 downwardly and to then rotate the cams into their release position, after which ram 80 is operated to lift loader arms 81 together with the loading head and turret assembly.

Assemblies 47 can be operated at any time after encapsulation to lift conduits 24, 27 and 28 away from conduits 8–10.

Finally, the open end of drum 76 can be sealed at a subsequent station and the drum removed for final disposal.

When the filling of cartridge 75 with encapsulating material has been completed and cartridge 75 has been placed into drum 76, the conduits supplying such material should be flushed to prevent plugging of the system with residual encapsulating material. Since this material is not radioactive, the associated lines and conduit 28 can be flushed into a further drum brought into position beneath cylinder 21 by conveyor 74. Ram 80 can be lowered and plate 46 can then be lowered to bring the outlet ends of conduits 24–28 to below the rim of the further drum and the lines can then be flushed by conducting a suitable solvent and entraining air through the lines which previously conducted the encapsulating material and through conduit 28. Cylinder 21 is then lifted and the further drum is then removed by conveyor 74 for sealing and disposal as non-radioactive waste or it can be handled with the drums containing radioactive waste, as required.

In the illustrated system, in-line radiation detectors are mounted on the inlet and outlet conduits of the loading head and turret assembly to measure the decontamination factor of the cartridge. The radiation activity in the backflush slurry will be due primarily to insoluable corrosion products therein. When matrix 18 in cartridge 75 reaches its holding capacity, the outlet monitor will indicate a corresponding increase in radiation activity to produce a signal indicating that the cartridge is loaded. Then, the slurry delivery process can be halted, either automatically or by an operator, and the resin filling process can be initiated. The instrumention employed can be calibrated to indicate differential radiation activity rather than an absolute level thereof, if desired.

The sealing of the top of the drum will normally be carried out at a location remote from the station shown in FIG. 5, the drum being brought to the sealing station by conveyor 74, and there being automatically sealed in a conventional manner.

The encapsulating material can be of any suitable, officially approved type which is already known in the art.

Since conduit 24 is only used to permit venting of air during the resin filling procedure, microswitch 42 will not come into contact with possibly corrosive liquid products.

The greatest likelihood of liquid collecting in the reservoir above plate portion 4 will occur after the waste material loading, flush and dewatering steps at the moment when turret 23 is raised and the connections between conduits 25, 26 and 24 and conduits 9, 8 and 10, respectively, are broken. Therefore, it is particularly desirable for pump 89 to be in operation at this time, and until after turret 23 has again been lowered to couple conduits 27, 28 and 24 to conduits 9, 8 and 10 respectively, prior to start of encapsulating material injection. Once that injection operation has started, pump 89 can be turned off.

It will be understood that the above description of the present invention is susceptible to various modifications, changes and adaptations and the same are intended to be comprehended with the meaning and range of the appended claims.

I claim:

1. A system for storage and encapsulation of radioactive particulate waste, comprising:

a cartridge having a liquid impervious casing enclosing a waste storage region, a ferromagnetic waste storage matrix housed in said cartridge and occupying at least a major portion of the waste storage region, and an inlet conduit and at least one outlet conduit projecting from said cartridge and communicating with the waste storage region;

means for establishing a magnetic field in said matrix;

fluid handling means including a source of liquid containing the radioactive waste to be stored in said cartridge, a source of encapsulating material, and a receptacle for receiving flushing water;

cartridge filling means including a plurality of conduits releasably couplable to said conduits associated with said cartridge; and fluid flow control means including a plurality of remotely controllable valves connected between said fluid handling means and said cartridge filling means, said fluid flow control means having a first operating state for supplying liquid containing the radioactive waste, from said source thereof to said inlet conduit for loading said matrix with radioactive waste, while placing one said outlet conduit in communication with said receptacle, and said fluid flow control means having a second operating state for supplying encapsulating material from said source thereof to said inlet conduit for filling said cartridge with encapsulating material, while permitting air in said cartridge to be expelled via one said outlet conduit.

2. A system as defined in claim 1 wherein said cartridge has first and second outlet conduits, said cartridge filling means is movable between a first operating position associated with the first operating state of said fluid flow control means and a second operating position associated with the second operating state of said fluid flow control means, said conduits of said cartridge filling means are grouped into a first set of conduits releasably couplable to said conduits associated with said cartridge when said cartridge filling means are in the first operating position, and a second set of conduits releasably couplable to said conduits associated with said cartridge when said cartridge filling means are in the second operating position, said one outlet conduit which is placed in communication with said receptacle is said first outlet conduit, and said one outlet conduit via which air is permitted to be expelled when said fluid flow control means is in the second operating state is said second outlet conduit.

3. A system as defined in claim 2 wherein one said conduit of said cartridge filling means is common to both said sets, and the movement of said cartridge filling means between its first and second operating positions is effected by pivoting said cartridge filling means about the axis of said one conduit.

4. A system as defined in claim 3 wherein said one conduit which is common to both said sets of conduits is positioned to be releasably couplable to said second outlet conduit associated with said cartridge.

5. A system as defined in claim 3 wherein said cartridge filling means comprise:

a turret carrying said plurality of conduits; a column supporting said turret; a loading head constituted by a cylindrical housing having a closed upper end and an open lower end, with said column extending through said closed upper end; and locking means mounted in said housing for locking said cartridge to said lower end of said housing while establishing a sealed connection between said cartridge and said housing.

6. A system as defined in claim 5 further comprising means supporting said column from said housing for permitting pivoting movement of said column about the axis of said one conduit between the first and second operating positions, and for displacing said column in the direction of the axis of said one conduit relative to said loading head between a raised position in which said conduits of said cartridge filling means are separated from said conduits associated with said cartridge, and a lowered, or coupled, position in which a respective set of said conduits of said cartridge filling means are coupled in a sealed manner to said conduits associated with said cartridge.

7. A system as defined in claim 1 wherein said cartridge is formed to present a liquid reservoir at its upper end, and further comprising a siphon tube mounted to be introduced into said reservoir when conduits of said cartridge filling means are coupled to said conduits associated with said cartridge, and means coupled to said siphon tube for aspirating any liquid present in said reservoir.

8. A system as defined in claim 1 in combination with a nuclear reactor system comprising at least one backflush filter, and means connecting said backflush filter to said source of liquid containing the radioactive waste and said receptacle for conducting flushing water from said receptacle to said backflush filter and liquid containing radioactive waste from said backflush filter to said source of liquid.

9. A method for operating the system defined in claim 2 for loading said matrix with particulate radioactive waste and encapsulating the waste with encapsulating material, comprising:

placing said cartridge filling means in the first operating position and coupling said first set of conduits in a sealed manner to said conduits associated with said cartridge;

operating said establishing means for establishing a magnetic field in said matrix;

while said first set of conduits is coupled to said conduits associated with said cartridge, effecting loading of waste material by operating said fluid flow control means for blocking said second outlet conduit and supplying liquid containing the radioactive waste via said inlet conduit to said waste storage region until said matrix is loaded with waste while conducting liquid from said waste storage region via said first outlet conduit to said receptacle;

after said step of effecting loading of waste material, decoupling said first set of conduits from said conduits associated with said cartridge, placing said cartridge filling means in the second operating position, and coupling said second set of conduits in a sealed manner to said conduits associated with said cartridge; and while said second set of conduits is coupled to said conduits associated with said cartridge, effecting encapsulation of the waste material by operating said fluid flow control means for blocking said first outlet conduit, and supplying encapsulating material via said inlet conduit until said waste storage region is filled with encapsulating material, while removing air from said waste storage region via said second outlet conduit.

10. A method as defined in claim 9 further comprising, during said step of effecting encapsulation: monitoring said second outlet conduit and producing an indication of the presence of an encapsulating material therein; and terminating the supplying of encapsulating material via said inlet conduit upon appearance of such indication.

11. A method as defined in claim 9 further comprising delivering flushing water from said receptacle to a backflushable filter in which radioactive waste is temporarily stored; and conducting liquid containing the radioactive waste from the filter to said source thereof for delivery to said cartridge.

12. A system as defined in claim 1 further comprising: a conveyor for conveying said cartridge along a path extending below said means for establishing a magnetic field; means couplable to said cartridge for moving said cartridge vertically between a lowered position in which said cartridge is supported by said conveyor and a raised position in which said matrix is disposed in the magnetic field; and means supporting said cartridge filling means for vertical movement into a position in which selected conduits of said filling means are coupled to said conduits of said cartridge when said cartridge is in its raised position.

13. A system as defined in claim 12 wherein said means supporting said cartridge filling means are pivotable between a first operating position associated with the first operating state of said fluid flow control means and a second operating position associated with the second operating state of said fluid flow control means.

14. A method as defined in claim 9 further comprising, after said step of effectuating encapsulation, decoupling said conduits associated with said cartridge filling means from said conduits associated with said cartridge lowering said cartridge onto a conveyor below said means for establishing a magnetic field, and conveying said cartridge away from said means for establishing a magnetic field by means of the conveyor.

* * * * *